(12) United States Patent
Huang et al.

(10) Patent No.: US 11,766,847 B2
(45) Date of Patent: Sep. 26, 2023

(54) MULTILAYER PLATE WITH COMPOSITE MATERIAL AND METHOD FOR MANUFACTURING THE SAME

(71) Applicant: METAL INDUSTRIES RESEARCH & DEVELOPMENT CENTRE, Kaohsiung (TW)

(72) Inventors: Yen-Lin Huang, Kaohsiung (TW); Pei-Jung Tsai, Pingtung County (TW); Chi-Wah Keong, Kaohsiung (TW)

(73) Assignee: METAL INDUSTRIES RESEARCH & DEVELOPMENT CENTRE, Kaohsiung (TW)

( * ) Notice: Subject to any disclaimer, the term of this patent is extended or adjusted under 35 U.S.C. 154(b) by 30 days.

(21) Appl. No.: 17/225,122

(22) Filed: Apr. 8, 2021

(65) Prior Publication Data
US 2021/0370643 A1    Dec. 2, 2021

(30) Foreign Application Priority Data
May 27, 2020    (TW) ................................. 109117724

(51) Int. Cl.
*B32B 37/06*    (2006.01)
*B32B 15/08*    (2006.01)
(Continued)

(52) U.S. Cl.
CPC ............ *B32B 15/08* (2013.01); *B29C 43/203* (2013.01); *B32B 3/266* (2013.01); *B32B 3/30* (2013.01); *B32B 5/14* (2013.01); *B32B 5/22* (2013.01); *B32B 15/043* (2013.01); *B32B 15/09* (2013.01); *B32B 15/20* (2013.01); *B32B 27/20* (2013.01); *B32B 27/365* (2013.01); *B32B 37/06* (2013.01); *B32B 37/10* (2013.01); *B32B 37/18* (2013.01);
(Continued)

(58) Field of Classification Search
CPC ......... B32B 37/06; B32B 37/10; B32B 37/18; B32B 38/004; B32B 38/08
See application file for complete search history.

(56) References Cited

U.S. PATENT DOCUMENTS

2015/0197048 A1    7/2015    Chiang et al.

FOREIGN PATENT DOCUMENTS

| CA | 2250136 A1 | 10/1997 |
|----|------------|---------|
| CN | 104085078 A | 10/2014 |

(Continued)

*Primary Examiner* — Binh X Tran
(74) *Attorney, Agent, or Firm* — CKC & Partners Co., LLC

(57) ABSTRACT

A multilayer plate with composite material and a method thereof are described. The multilayer plate includes an aluminum-based thin sheet and a composite material layer. The aluminum-based thin sheet includes a first passivation layer, an aluminum-based metal layer, and a second passivation layer sequentially. The aluminum-based thin sheet includes a first surface and a second surface opposite to the first surface. The first and second surfaces are set with micro holes. A diameter of the micro holes in the second surface is ranging from 0.5 μm to 10 μm. The composite material layer includes a thermoplastic polymer and a fiber material. The composite material layer has a third surface and a fourth surface opposite each other. The second surface is adjacent to or connected to the third surface. At least one portion of the thermoplastic polymer fills into the micro holes in the second surface.

7 Claims, 4 Drawing Sheets

(51) Int. Cl.
- *B32B 15/20* (2006.01)
- *B32B 3/26* (2006.01)
- *B32B 3/30* (2006.01)
- *B32B 37/10* (2006.01)
- *B32B 37/18* (2006.01)
- *B32B 38/08* (2006.01)
- *B32B 38/10* (2006.01)
- *B32B 38/00* (2006.01)
- *B29C 43/20* (2006.01)
- *B32B 15/09* (2006.01)
- *B32B 27/20* (2006.01)
- *B32B 27/36* (2006.01)
- *B32B 5/14* (2006.01)
- *B32B 5/22* (2006.01)
- *B32B 15/04* (2006.01)
- *C23F 1/36* (2006.01)
- *B32B 37/24* (2006.01)

(52) U.S. Cl.
CPC ............ *B32B 38/004* (2013.01); *B32B 38/08* (2013.01); *B32B 38/10* (2013.01); *C23F 1/36* (2013.01); *B32B 2037/243* (2013.01); *B32B 2250/40* (2013.01); *B32B 2250/42* (2013.01); *B32B 2255/06* (2013.01); *B32B 2255/26* (2013.01); *B32B 2260/02* (2013.01); *B32B 2260/046* (2013.01); *B32B 2262/101* (2013.01); *B32B 2305/026* (2013.01); *B32B 2307/538* (2013.01); *B32B 2307/546* (2013.01); *B32B 2307/714* (2013.01); *B32B 2307/72* (2013.01); *B32B 2307/732* (2013.01); *B32B 2310/00* (2013.01); *B32B 2311/24* (2013.01); *B32B 2457/00* (2013.01)

(56) References Cited

FOREIGN PATENT DOCUMENTS

| | | | | | |
|---|---|---|---|---|---|
| CN | 104157580 | A | * | 11/2014 | ......... H01L 21/4871 |
| CN | 105644062 | A | | 6/2016 | |
| CN | 106739364 | A | * | 5/2017 | |
| CN | 104838634 | B | | 10/2017 | |
| CN | 206544362 | U | | 10/2017 | |
| CN | 104780241 | B | | 6/2018 | |
| CN | 110475885 | A | * | 11/2019 | ............. C22C 21/02 |
| EP | 1615766 | B1 | | 9/2006 | |
| KR | 20210120732 | A | * | 10/2021 | |
| TW | 140050 | | | 8/1990 | |

* cited by examiner

MULTILAYER PLATE WITH COMPOSITE MATERIAL AND METHOD FOR MANUFACTURING THE SAME

RELATED APPLICATIONS

This application claims priority to Taiwan Application Serial Number 109117724, filed May 27, 2020, which is herein incorporated by reference.

BACKGROUND

Field of Invention

The present disclosure relates to a technique for manufacturing a hybrid material, and more particularly, to a multilayer plate with composite material and a method for manufacturing the same.

Description of Related Art

Consumers' demand for 3C products is not only light and thin, but also more and more concerned about a metal texture of a shell. For example, the materials of the shells of the current commercially available notebooks may generally be divided into three categories, namely, plastic, metal, and fiber composite. The metal shell is sturdy, elegant in appearance, and delicate in touch, such that the main demand for high-end notebook products is metal texture, especially the texture of an aluminum alloy with an anodized color.

Currently, most of the shells of the thin and light notebooks use aluminum alloy materials colored by an anodizing treatment. With the pursuit of thinner and lighter notebooks, the demand for materials, which are lighter than anodized aluminum alloy shells and have metallic textures, has also increased.

One solution is to use materials that are lighter than aluminum alloys. Typically, a density of an aluminum alloy material is about 2.70 $g/cm^3$. Materials that are lighter than the aluminum alloy include magnesium alloys and carbon fiber composite materials, in which a density of the magnesium alloy is about 1.83 $g/cm^3$, and a density of the carbon fiber composite material is about 1.55 $g/cm^3$, both of which can decrease the weight of the shell. However, the magnesium alloys and the carbon fiber composite materials can only be painted by spray paint, which is prone to problems, such as fat edges or orange peel. In addition, the textures of the magnesium alloys and the carbon fiber composite materials after painting are not as good as the anodized aluminum alloys.

Another solution is to stick an aluminum alloy skin on a surface of a plastic structure by a gluing method to obtain a metallic shell. However, the strength of the plastic is low, and if someone wants to obtain the bending strength that meets the product specifications, he must increase the thickness of the plastic, so the demand for lightness and thinness cannot be achieved.

One solution is to coat metal particles on an outer layer of a glass fiber composite material by cold spraying to obtain a lightweight shell with a metallic texture. However, the pressure of the cold spraying deforms the glass fiber composite material. If it is replaced with the carbon fiber composite material, although the deformation caused by the cold spraying can be suppressed, the cost will increase, such that the product will not be competitive in the market.

One technique is to metalize a surface of a plastic material by using a vacuum vapor deposition method, and then to anodize the metalized plastic material components to make the appearance of the components more textured. However, such a technique has a higher cost due to the vacuum coating. In addition, for large-size or polymer materials, such a deposition method is not suitable for forming the metal film.

Another technique for manufacturing a mobile phone shell is to form an oxide layer on a surface of a metal component, in which the oxide layer has tiny holes. Then, the metal component is immersed and corroded to form another holes, so that these holes are connected to the tiny holes previously formed in the oxide layer to form a double-layered three-dimensional space structure. Next, a resin is injected and infused into these double-layered holes to achieve a mechanical locking effect between the resin and the oxide layer on the metal component, thereby increasing the bonding strength between the dissimilar materials of the resin and the metal component. However, because diameters of the holes are too small, when non-injection processes such as sheet hot-pressing bond processes are used, the gas in the holes usually cannot be discharged, thus resulting in poor bonding between the resin and the metal component, which is easy to cause delamination between the dissimilar materials.

SUMMARY

Therefore, one objective of the present invention is to provide a multilayer plate with composite material and a method for manufacturing the same, in which at least one aluminum-based thin sheet and at least one composite material layer are stacked and hot pressed to form the multilayer plate with composite material. Various multilayer plates with composite material of metallic texture and light weight can be successfully obtained by adjusting a ratio of the aluminum-based thin sheets to the composite material layers.

Another objective of the present invention is to provide a multilayer plate with composite material and a method for manufacturing the same, in which micro structure holes with obvious acute-angle appearance may be firstly formed in surfaces of the aluminum-based thin sheet by using a chemical etching method. Thus, by hot pressing the stacked structure of the aluminum-based thin sheet and the composite material layer directly, the hot pressed aluminum-based thin sheet and the composite material layer may be bonded firmly without using glue to bond the dissimilar materials of the aluminum-based thin sheet and the composite material layer.

Still another objective of the present invention is to provide a multilayer plate with composite material and a method for manufacturing the same, in which there is no glue between the aluminum-based thin sheet and the composite material layer, such that the multilayer plate can sustain an acid solution and an alkaline solution in an anodizing process without delamination, and various multilayer plates with metallic texture and light weight can be effectively formed.

According to the aforementioned objectives, the present invention provides a multilayer plate with composite material. The multilayer plate with composite material includes an aluminum-based thin sheet and a composite material layer. The aluminum-based thin sheet includes a first passivation layer, an aluminum-based metal layer, and a second passivation layer sequentially. The aluminum-based metal layer includes a first surface and a second surface, which is opposite to the first surface. The first surface and the second surface both are set with a plurality of micro holes, and a diameter of the micro holes of the second surface is ranging from 0.5 μm to 10 μm. The composite material layer includes a thermoplastic polymer and a fiber material. The composite material layer includes a third surface and a fourth surface, which is opposite to the third surface. The second surface is adjacent to or connected to the third surface, and the at least one portion of the thermoplastic polymer fills into the micro holes of the second surface.

According to one embodiment of the present invention, a diameter of the micro holes of the first surface is ranging from 0.01 μm to 0.1 μm.

According to one embodiment of the present invention, an average roughness of the second surface is ranging from 1.5 μm to 3.5 μm.

According to one embodiment of the present invention, at least part of the micro holes of the second surface have acute-angle appearance.

According to one embodiment of the present invention, a thickness of the first passivation layer is greater than a thickness of the second passivation layer.

According to one embodiment of the present invention, the multilayer plate with composite material further includes a second aluminum-based thin sheet, in which the second aluminum-based thin sheet is adjacent to or connected to the fourth surface.

According to the aforementioned objectives, the present invention further provides a method for manufacturing a multilayer plate with composite material. In this method, at least one aluminum-based thin sheet is provided. A third surface and a second surface, which are opposite to each other, of each aluminum-based thin sheet both are formed with a plurality of micro holes. At least one composite material layer and the at least one aluminum-based thin sheet are stacked alternatively to form a multilayer plate, in which a number of the at least one composite material layer is smaller than or equal to a number of the at least one aluminum-based thin sheet. A hot pressing operation is performed on the multilayer plate to fill a portion of each of the at least one composite material layer into the micro holes of the adjacent aluminum-based thin sheet. A passivation process of an anodizing treatment is performed on the multilayer plate to form a first passivation layer on the third surface and a first surface.

According to one embodiment of the present invention, providing the at least one aluminum-based thin sheet includes performing a chemical etching operation on an aluminum-based metal layer of the at least one aluminum-based thin sheet to form the third surface and the second surface of the at least one aluminum-based thin sheet having the micro holes with acute-angle appearance.

According to one embodiment of the present invention, providing the at least one aluminum-based thin sheet includes performing a hot rolling thinning treatment on an aluminum-based metal sheet to form an aluminum-based metal layer of the at least one aluminum-based thin sheet.

According to one embodiment of the present invention, performing the hot rolling thinning treatment includes forming surfaces of the aluminum-based metal layer of the at least one aluminum-based thin sheet having crystal grain preferred orientation of (110) plane.

BRIEF DESCRIPTION OF THE DRAWINGS

The aforementioned and other objectives, features, advantages, and embodiments of the present disclosure can be more fully understood by reading the following detailed description of the embodiment, with reference made to the accompanying drawings as follows.

DETAILED DESCRIPTION

In view of the prior arts have a bottleneck in developing materials with metallic texture, the embodiments of the present invention provide a multilayer plate with composite material and a method for manufacturing the same, which stacks one or more aluminum-based thin sheets on one or more thermoplastic fiber composition materials to form a multilayer plate with composition material. The multilayer plate is lighter than an aluminum alloy and has metallic texture, and is suitable as a high-quality shell material of a 3C product. In addition, the multilayer plate can achieve different lightweight degrees by adjusting a ratio of the stacked layers, and an outer layer of aluminum alloy thin sheet can obtain the desired metallic texture after a coloring treatment of an anodizing treatment.

Figure 1:
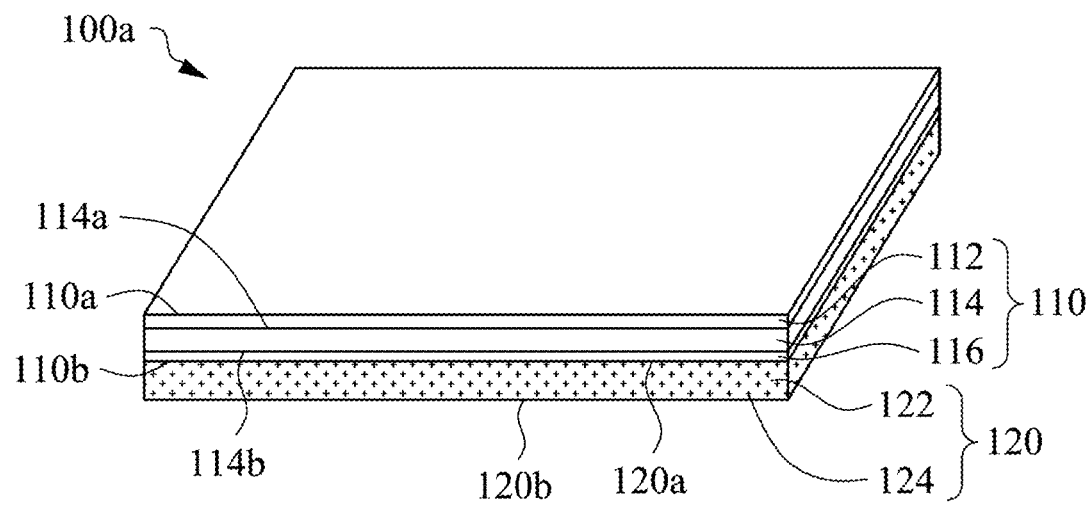
FIG. 1 is a schematic three-dimensional diagram of a multilayer plate with composite material in accordance with a first embodiment of the present invention.
Figure 2:
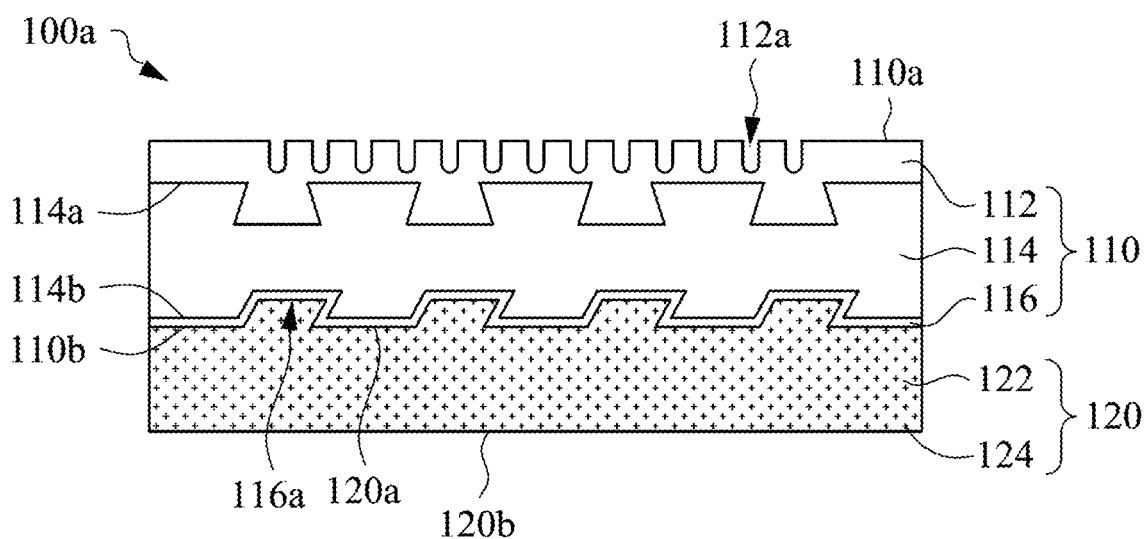
FIG. 2 is a schematic partial enlarged cross-sectional view of the multilayer plate in FIG. 1.
Figure 3:
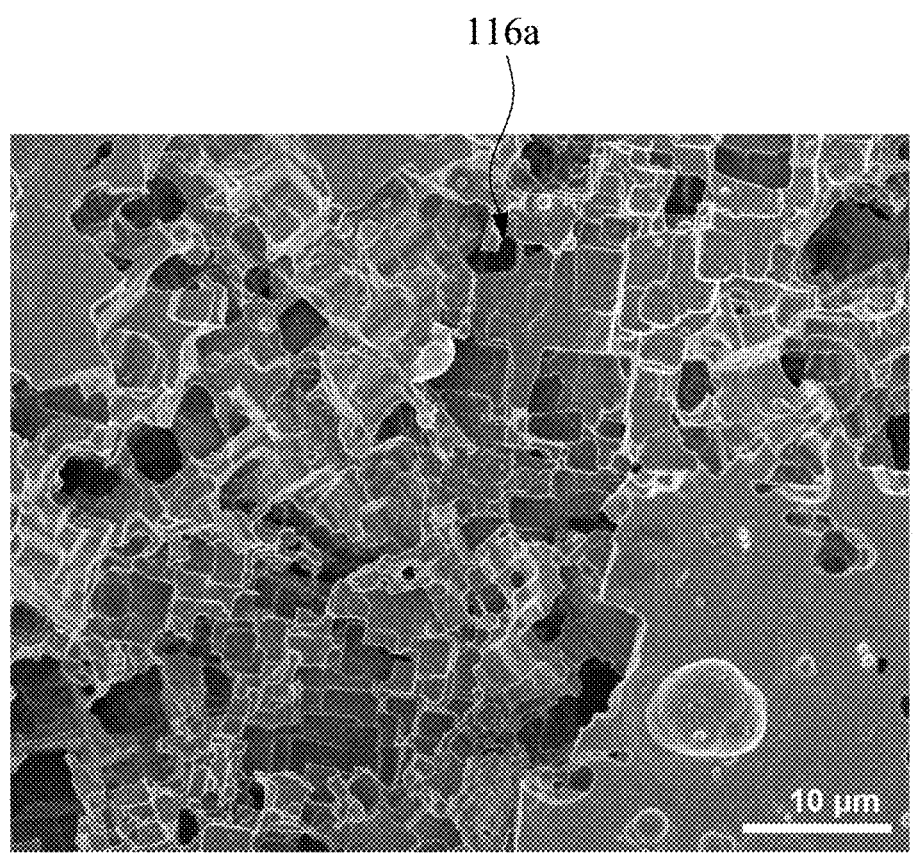
FIG. 3 is a scanning electron microscope image of a multilayer plate with composite material in accordance with a first embodiment of the present invention.

Referring to FIG. 1 to FIG. 3, FIG. 1 is a schematic three-dimensional diagram of a multilayer plate with composite material in accordance with a first embodiment of the present invention, FIG. 2 is a schematic partial enlarged cross-sectional view of the multilayer plate in FIG. 1, and FIG. 3 is a scanning electron microscope image of a multilayer plate with composite material in accordance with a first embodiment of the present invention. A multilayer plate 100*a* with composite material of the present embodiment includes an aluminum-based thin sheet 110 and a composite material layer 120. The aluminum-based thin sheet 110 includes a first passivation layer 112, an aluminum-based metal layer 114, and a second passivation layer 116 sequentially. The composite material layer 120 includes thermoplastic polymer 122 and a fiber material 124 distributed in the thermoplastic polymer 122. In the present embodiment, the numbers of the aluminum-based thin sheet 110 and the composite material layer 120 are the same, and both are one. As shown in FIG. 1, the aluminum-based thin sheet 110 and the composite material layer 120 are stacked with each other. The aluminum-based thin sheet 110 has a first surface 110*a* and a second surface 110*b*, which are opposite to each other. In one example, the aluminum-based metal layer 114 has a third surface 114*a* and a fourth surface 114*b*. In addition, the third surface 114*a*, the fourth surface 114*b*, or both have crystal grain preferred orientation of (110) plane. In one example, X-ray diffraction analysis can prove the third surface 114*a*, the fourth surface 114*b*, or both have the crystal grain preferred orientation of (110) plane. In one example, the intensity of the X-ray diffraction analysis on the (110) plane of the surface of the aluminum-based metal layer 114 is greater than those on (100) plane and (111) plane.

In one example, many first micro holes 112a and many second micro holes 116a are respectively distributed in the first surface 110a and the second surface 110b of the aluminum-based thin sheet 110, as shown in FIG. 2. In one example, an average diameter of the first micro holes 112a is smaller than an average diameter of the second micro holes 116a. In one example, a diameter of each of the first micro holes 112a may be ranging from about 0.01 μm to about 0.1 μm. As shown in FIG. 3, in one example, a diameter of each of the second micro holes 116a may be ranging from about 0.5 μm to about 10 μm. In another example, the diameter of each of the second micro holes 116a may be ranging from about 1 μm to about 4 μm. The diameter of the second micro hole 116a is equal to or greater than 0.5 μm, such that the thermoplastic polymer 122 of the composite material layer 120 can fully fill the second micro holes 116a in a hot pressing process of the aluminum-based thin sheet 110 and the composite material layer 120, and thus good bonding and air tightness between the aluminum-based thin sheet 110 and the composite material layer 120 can be achieved. In addition, in one example, an average roughness (Ra) of the first surface 110a of the aluminum-based thin sheet 110 may be ranging from 0.1 μm to 0.5 μm, and an average roughness of the second surface 110b may be ranging from 1.5 μm to 3.5 μm. In one example, shapes of most of the second micro holes 116a are square, rectangle, or polygon with acute-angle appearance, rather than circular arc appearance.

Referring to FIG. 2, a thickness of the first passivation layer 112 is greater than a thickness of the second passivation layer 116.

With the tight bonding between the second passivation layer 116 and the thermoplastic polymer 122, the bonding surface between the aluminum-based thin sheet 110 and the composite material layer 120 can withstand the corrosion of an acid solution and an alkaline solution in an anodizing treatment. Thereby, an anodizing treatment can be performed on the multilayer plate 100a with composite material, so that the surfaces of the multilayer plate 100a with composite material have metallic texture after being colored in the anodizing treatment. In some examples, after a salt spray test for 1000 hours, a surface layer of the multilayer plate 100a with composite material can achieve 5B rate in a cross-cut adhesion test.

The composite material layer 120 has a first surface 120a and a second surface 120b, which are opposite to each other. The first surface 120a of the composite material layer 120 is pressed and bonded on the second surface 110b of the aluminum-based thin sheet 110, and a portion of the thermoplastic polymer 122 of the composite material layer 120 is embedded into the second micro holes 116a of the adjacent second surface 110b of the aluminum-based thin sheet 110. Part of the second micro holes 116a of the aluminum-based thin sheet 110 have acute-angle appearance, such that good bonding and air tightness between the composite material layer 120 and the aluminum-based thin sheet 110 can be achieved.

For example, the fiber material 124 of the composite material layer 120 may be carbon fiber or glass fiber. The thermoplastic polymer 122 may be, for example, polypropylene (PP), polyvinyl chloride (PVC), polycarbonate (PC), polyamide (PA) resin, polyetheretherketone (PEEK), thermoplastic polyimide (TPI), or polyphenylene sulfide (PPS).

As shown in FIG. 1, in some examples, the first passivation layer 112 and the second passivation layer 116 of the multilayer plate 100a with composite material may be oxide layers of the material of the aluminum-based metal layer 114, such as aluminum oxide ($A_2O_3$) layers. In one example, the first passivation layer 112 is treated by an anode passivation treatment, such that a thickness and a pore size of the first passivation layer 112 are different from those of the second passivation layer 116.

Figure 4:
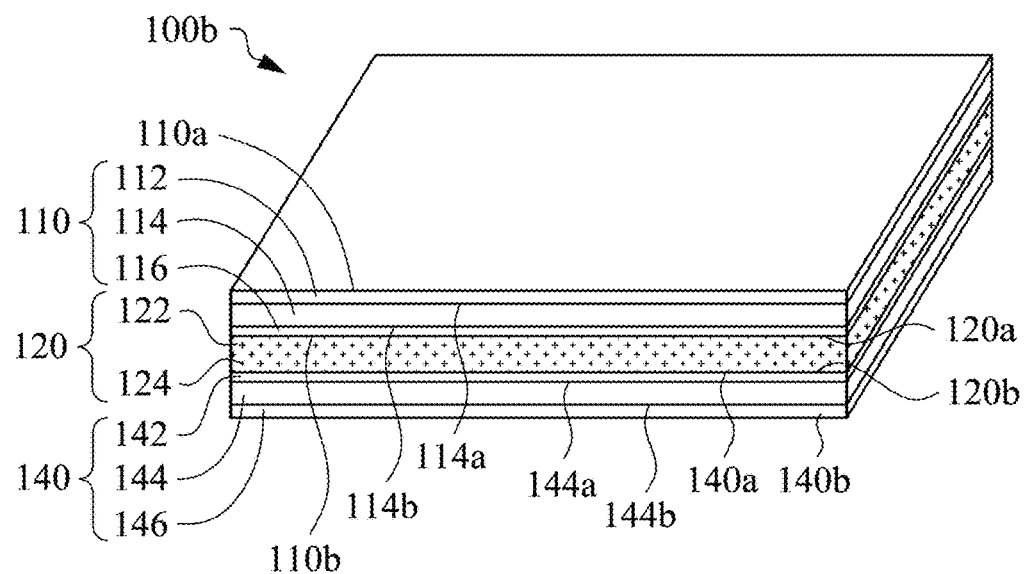
FIG. 4 is a schematic three-dimensional diagram of a multilayer plate with composite material in accordance with a second embodiment of the present invention.

Referring to FIG. 4, FIG. 4 is a schematic three-dimensional diagram of a multilayer plate with composite material in accordance with a second embodiment of the present invention. A structure of a multilayer plate 100b with composite material of the present embodiment is substantially similar to that of the multilayer plate 100a with composite material, and a difference between the two is that the multilayer plate 100b with composite material includes two aluminum-based thin sheets 110 and 140. Thus, the number of the aluminum-based thin sheets 110 and 140 of the multilayer plate 100b with composite material is one more than the number of the composite material layer 120.

The aluminum-based thin sheet 140 includes a third passivation layer 142, an aluminum-based metal layer 144, and a fourth passivation layer 146 sequentially. The aluminum-based thin sheet 140 has a first surface 140a and a second surface 140b, which are opposite to each other. The composition of the aluminum-based metal layer 144 may be the same as the composition of the aluminum-based metal layer 114, or may be different from the composition of the aluminum-based metal layer 114. In one example, the aluminum-based metal layer 144 has a third surface 144a and a fourth surface 144b. In addition, the third surface 144a and/or the fourth surface 144b have crystal grain preferred orientation of (110) plane. In one example, the intensity of X-ray diffraction analysis on (110) plane of the surface of the aluminum-based metal layer 144 is greater than those on (100) plane and (111) plane.

Many micro holes (not shown) are respectively distributed in the first surface 140a and the second surface 140b of the aluminum-based thin sheet 140. Types and sizes of the micro holes distributed in the first surface 140a and the micro holes distributed in the second surface 140b of the aluminum-based thin sheet 140 are respectively as those of the second micro holes 116a and the first micro holes 112a. Since the types and the sizes of the first micro holes 112a and the second micro holes 116a have been described above in detail, the types and the sizes of the micro holes in the first surface 140a and the second surface 140b of the aluminum-based thin sheet 140 will not be described in detail herein. Furthermore, in one example, an average roughness of the first surface 140a of the aluminum-based thin sheet 140 may be ranging from 1.5 μm to 3.5 μm, and an average roughness of the second surface 140b may be ranging from 0.1 μm to 0.5 μm.

In addition, as shown in FIG. 4, a thickness of the third passivation layer 142 is smaller than a thickness of the fourth passivation layer 146.

Under the tight bonding of the thermoplastic polymer 122, the second passivation layer 116, and the third passivation layer 142, the bonding surface between the aluminum-based thin sheet 110 and the composite material layer 120 and the bonding surface between the aluminum-based thin sheet 140 and the composite material layer 120 can withstand the corrosion of an acid solution and an alkaline solution in an anodizing treatment. Thereby, an anodizing treatment can be performed on the multilayer plate 100b with composite material, so that the surfaces of the multilayer plate 100b with composite material have metallic texture after being colored in the anodizing treatment.

In the multilayer plate 100b with composite material, the aluminum-based thin sheets 110 and 140 and the composite material layer 120 are stacked alternatively, such that the composite material layer 120 is sandwiched between the aluminum-based thin sheets 110 and 140. The first surface 120a and the second surface 120b of the composite material layer 120 are respectively pressed and bonded on the second surface 110b of the aluminum-based thin sheet 110 and the first surface 140a of the aluminum-based thin sheet 140. In addition, the aluminum-based thin sheets 110 and 140 are respectively two outer layers of the multilayer plate 100b with composite material.

A portion of the thermoplastic polymer 122 of the composite material layer 120 is embedded into the second micro holes 116a of the adjacent second surface 110b of the aluminum-based thin sheet 110, and another portion of the thermoplastic polymer 122 is embedded into the micro holes of the adjacent first surface 140a of the aluminum-based thin sheet 140. The second micro holes 116a of the aluminum-based thin sheet 110 and the micro holes in the first surface 140a of the aluminum-based thin sheet 140 both have acute-angle appearance, such that good bonding and air tightness between the composite material layer 120 and the aluminum-based thin sheet 110, and between the composite material layer 120 and the aluminum-based thin sheet 140 can be achieved.

As shown in FIG. 4, in one example, the third passivation layer 142 and the fourth passivation layer 146 of the aluminum-based thin sheet 140 may be oxide layers of the material of the aluminum-based metal layer 144, such as aluminum oxide layers. In one example, the fourth passivation layer 146 is treated by an anode passivation treatment, such that a thickness and a pore size of the fourth passivation layer 146 are different from those of the third passivation layer 142.

Figure 5:
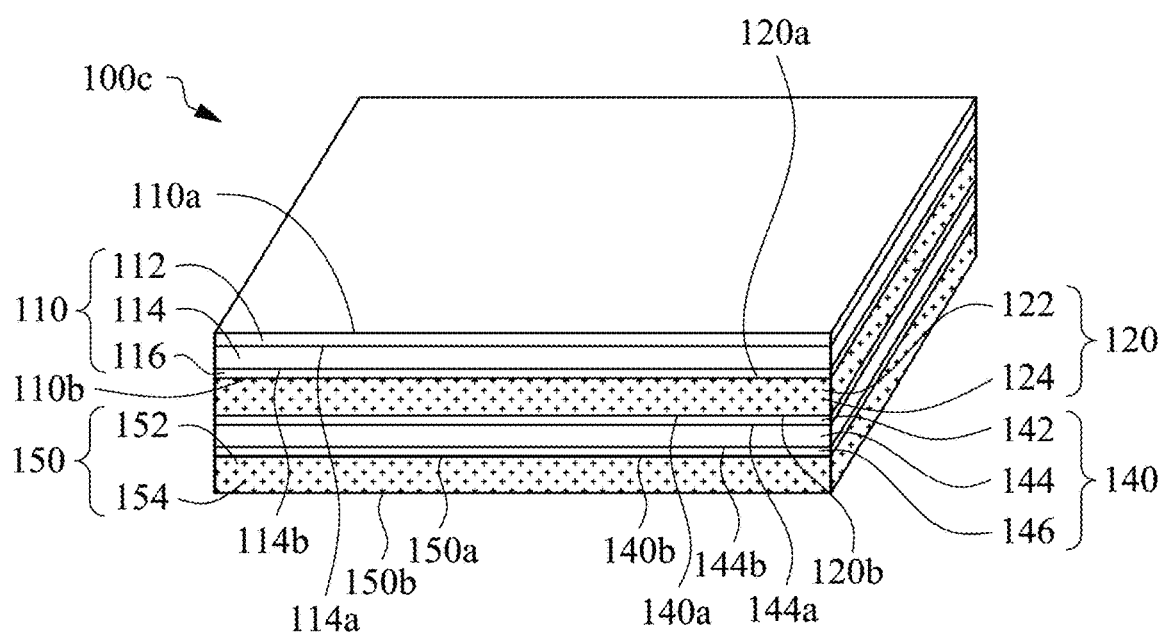
FIG. 5 is a schematic three-dimensional diagram of a multilayer plate with composite material in accordance with a third embodiment of the present invention.

Referring to FIG. 5, FIG. 5 is a schematic three-dimensional diagram of a multilayer plate with composite material in accordance with a third embodiment of the present invention. A structure of a multilayer plate 100c with composite material of the present embodiment is substantially similar to that of the multilayer plate 100b with composite material shown in FIG. 4, and a difference between the two is that the multilayer plate 100c with composite material includes two composite material layers 120 and 150. Thus, the number of the aluminum-based thin sheets 110 and 140 of the multilayer plate 100c with composite material is the same as the number of the number of the composite material layers 120 and 150.

The composite material layer 150 includes thermoplastic polymer 152 and a fiber material 154. The composition of the thermoplastic polymer 152 may be the same as the composition of the thermoplastic polymer 122, or may be different from the composition of the thermoplastic polymer 122. The composition of the fiber material 154 may be the same as or different from the composition of the fiber material 124. The composite material layer 150 has a first surface 150a and a second surface 150b, which are opposite to each other.

Under the tight bonding of the thermoplastic polymer 122, the second passivation layer 116 and the third passivation layer 142, and the tight bonding of the thermoplastic polymer 152 and the fourth passivation layer 146, the bonding surfaces between the aluminum-based thin sheets 110 and 140 and the composite material layers 120 and 150 can withstand the corrosion of an acid solution and an alkaline solution in an anodizing treatment. Thereby, an anodizing treatment can be performed on the multilayer plate 100c with composite material, so that the surfaces of the multilayer plate 100c with composite material have metallic texture after being colored in the anodizing treatment.

In the multilayer plate 100c with composite material, the aluminum-based thin sheets 110 and 140 and the composite material layers 120 and 150 are stacked alternatively, such that the aluminum-based thin sheet 110 of the aluminum-based thin sheets 110 and 140 is an outer layer of the multilayer plate 100c with composite material. The first surface 150a of the composite material layer 150 is pressed and bonded on the second surface 140b of the aluminum-based thin sheet 140, and a portion of the thermoplastic polymer 152 of the composite material layer 150 is embedded into the micro holes of the adjacent second surface 140b of the aluminum-based thin sheet 140. At least part of the micro holes in the second surface 140b of the aluminum-based thin sheet 140 have acute-angle appearance, such that good bonding and air tightness between the composite material layer 150 and the aluminum-based thin sheet 140 can be achieved.

Figure 6:
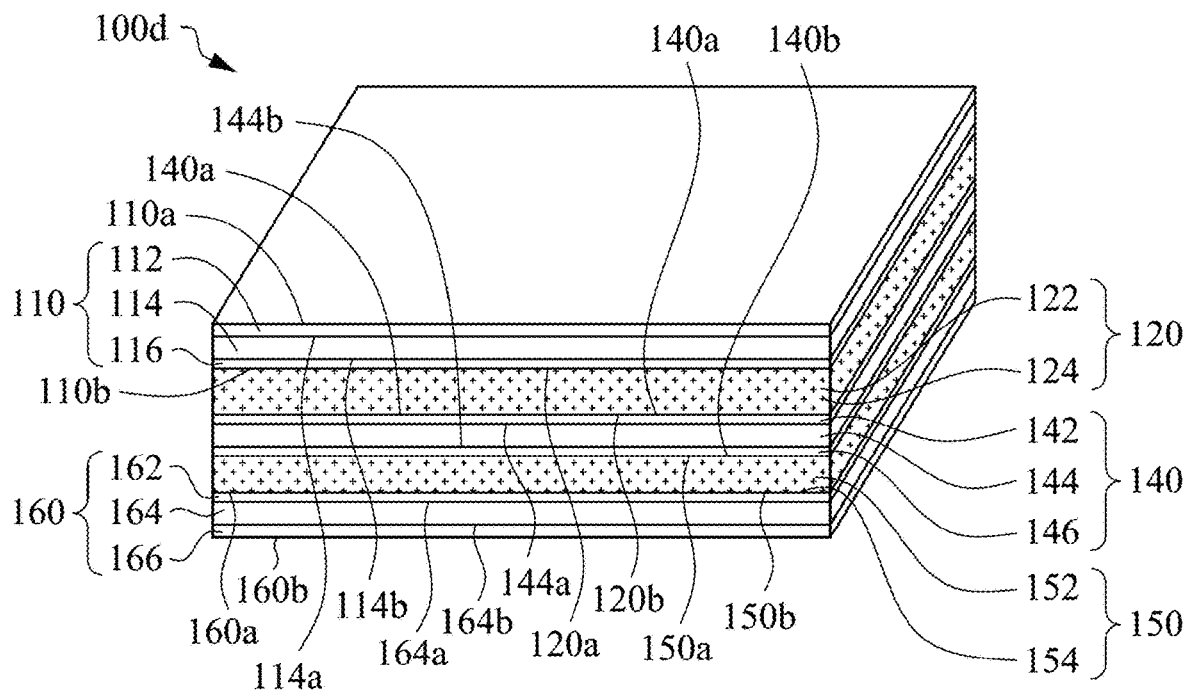
FIG. 6 is a schematic three-dimensional diagram of a multilayer plate with composite material in accordance with a fourth embodiment of the present invention.

Referring to FIG. 6, FIG. 6 is a schematic three-dimensional diagram of a multilayer plate with composite material in accordance with a fourth embodiment of the present invention. A structure of a multilayer plate 100d with composite material of the present embodiment is substantially similar to that of the multilayer plate 100c with composite material shown in FIG. 5, and a difference between the two is that the multilayer plate 100d with composite material includes three aluminum-based thin sheets 110, 140, and 160. Thus, the number of the aluminum-based thin sheets 110, 140, and 160 of the multilayer plate 100d with composite material is one more than the number of the composite material layers 120 and 150.

The aluminum-based thin sheet 160 includes a fifth passivation layer 162, an aluminum-based metal layer 164, and a sixth passivation layer 166 sequentially. The aluminum-based thin sheet 160 has a first surface 160a and a second surface 160b, which are opposite to each other. The composition of the aluminum-based metal layer 164 may be the same as the composition of the aluminum-based metal layers 114 and 144, may be different from the composition of the aluminum-based metal layers 114 and 144, or may be the same as the composition of one of the aluminum-based metal layers 114 and 144 and different from the composition of the other one of the aluminum-based metal layers 114 and 144. In one example, the aluminum-based metal layer 164 has a third surface 164a and a fourth surface 164b. In addition, the third surface 164a and/or the fourth surface 164b have crystal grain preferred orientation of (110) plane. In one example, the intensity of X-ray diffraction analysis on (110) plane of the surface of the aluminum-based metal layer 164 is greater than those on (100) plane and (111) plane.

Many micro holes (not shown) are respectively distributed in the first surface 160a and the second surface 160b of the aluminum-based thin sheet 160. Types and sizes of the micro holes distributed in the first surface 160a and the micro holes distributed in the second surface 160b of the aluminum-based thin sheet 160 are respectively as those of the second micro holes 116a and the first micro holes 112a. Thus, the types and the sizes of the micro holes in the first surface 160a and the second surface 160b of the aluminum-based thin sheet 160 will not be described in detail herein.

Furthermore, in one example, an average roughness of the first surface 160a of the aluminum-based thin sheet 160 may be ranging from 1.5 μm to 3.5 μm, and an average roughness of the second surface 160b may be ranging from 0.1 μm to 0.5 μm.

Moreover, as shown in FIG. 6, a thickness of the fifth passivation layer 162 is smaller than a thickness of the sixth passivation layer 166.

Under the tight bonding of the thermoplastic polymer 122, the second passivation layer 116 and the third passivation layer 142, and the tight bonding of the thermoplastic polymer 152, the fourth passivation layer 146 and the fifth passivation layer 162, the bonding surfaces between the aluminum-based thin sheets 110, 140, and 160 and the composite material layers 120 and 150 can withstand the corrosion of an acid solution and an alkaline solution in an anodizing treatment. Thereby, an anodizing treatment can be performed on the multilayer plate 100d with composite material, so that the surfaces of the multilayer plate 100d with composite material have metallic texture after being colored in the anodizing treatment.

In the multilayer plate 100d with composite material, the aluminum-based thin sheets 110, 140, and 160 and the composite material layers 120 and 150 are stacked alternatively, such that the composite material layers 120 and 150 are sandwiched between the aluminum-based thin sheets 110 and 140, and between the aluminum-based thin sheets 140 and 160 respectively. The second surface 150b of the composite material layer 150 is pressed and bonded on the first surface 160a of the aluminum-based thin sheet 160. In addition, the aluminum-based thin sheets 110 and 160 are respectively two outer layers of the multilayer plate 100d with composite material.

Another portion of the thermoplastic polymer 152 of the composite material layer 150 is embedded into the micro holes of the adjacent first surface 160a of the aluminum-based thin sheet 160. At least part of the micro holes of the aluminum-based thin sheet 160 have acute-angle appearance, such that good bonding and air tightness between the composite material layer 150 and the aluminum-based thin sheet 160 can be achieved.

As shown in FIG. 6, in one example, the fifth passivation layer 162 and the sixth passivation layer 166 of the aluminum-based thin sheet 160 may be oxide layers of the material of the aluminum-based metal layer 164, such as aluminum oxide layers. In one example, the sixth passivation layer 166 is treated by an anode passivation treatment, such that a thickness and a pore size of the sixth passivation layer 166 are different from those of the fifth passivation layer 162.

According to the aforementioned embodiments, the present invention can adjust a lamination ratio of the aluminum-based thin sheets and the composite material layers in the multilayer plate with composite material to achieve different weight reduction. For example, the multilayer plate with composite material may be at least 15% lighter than an aluminum alloy. Based on the aforementioned embodiments, the multilayer plate with composite material of the present invention includes at least one aluminum-based thin sheet and at least one composite material layer that are alternatively laminated, and the number of the at least one composite material layer may be equal to or smaller than the number of the at least one aluminum-based thin sheet.

Figure 7:
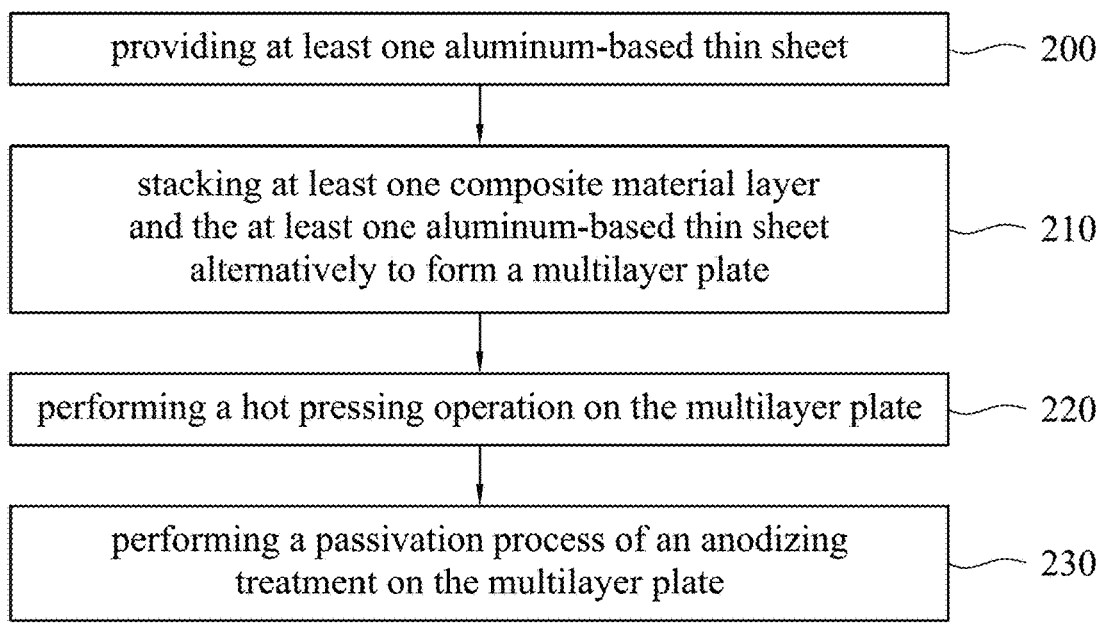
FIG. 7 is a flow chart of a method for manufacturing a multilayer plate with composite material in accordance with one embodiment of the present invention.

Referring FIG. 7, FIG. 7 is a flow chart of a method for manufacturing a multilayer plate with composite material in accordance with one embodiment of the present invention. In manufacturing a multilayer plate with composite material, a step 200 may be firstly performed to provide at least one aluminum-based thin sheet, such as the aluminum-based thin sheet 110 shown in FIG. 1, the aluminum-based thin sheets 110 and 140 shown in FIG. 3 and FIG. 5, or the aluminum-based thin sheets 110, 140, and 160 shown in FIG. 6. In some examples, in the providing of the aluminum-based thin sheet, a hot rolling thinning treatment may be performed on an aluminum-based metal sheet to form an aluminum-based metal layer with a desired thickness. In one example, performing the hot rolling thinning treatment on the aluminum-based metal sheet may form surfaces of the aluminum-based metal layer having crystal grain preferred orientation of (110) plane. For example, a temperature in the hot rolling thinning treatment may be controlled at about 270 degrees Celsius.

In one example, in the providing of the aluminum-based thin sheet, after the aluminum-based metal layer is formed, a chemical etching operation may be performed on an aluminum-based metal layer to etch the aluminum-based metal layer, so as to form micro holes with acute-angle appearance in surfaces of the aluminum-based metal layer. The inventors found that the surfaces of the aluminum-based metal layer having crystal grain preferred orientation of (110) plane can be formed with the micro holes with obvious acute-angle appearance after the chemical etching operation. Shapes of most of the micro holes are square, rectangle, or polygon with acute-angle appearance, rather than circular arc appearance. In one example, a diameter of each of the micro holes may be ranging from about 0.5 μm to about 10 μm. In another example, a diameter of each of the micro holes may be ranging from about 1 μm to about 4 μm. Furthermore, an average roughness of the surfaces of the aluminum-based metal layer may be ranging from 1.5 μm to 3.5 μm, for example.

The inventors also found that the surfaces of the aluminum-based metal layer having crystal grain preferred orientation of (110) plane have lower strain energy, such that passivation films are easily and rapidly formed on the surfaces of the aluminum-based metal layer. Thus, on one example, in the providing of the aluminum-based thin sheet, after the thinning of the aluminum-based metal layer is completed, passivation layers may be formed to respectively cover the surfaces of the aluminum-based metal layer. The passivation layers may be oxide layers of the material of the aluminum-based metal layer, such as aluminum oxide layers. The passivation layers can protect the aluminum-based metal layer from being corroded by an acid solution and an alkaline solution.

After the aluminum-based thin sheet is provided, a step 210 may be performed to provide at least one composite material layer, such as the composite material layer 120 shown in FIG. 1 and FIG. 4, or the composite material layers 120 and 150 shown in FIG. 5 and FIG. 6. Then, the composite material layer(s) and the aluminum-based thin sheet(s) are alternatively stacked to form a multilayer plate. In the present embodiment, the steps of providing the aluminum-based thin sheet(s) and the composite material layer(s) can be adjusted, in which the composite material layer(s) may be firstly provided, or the aluminum-based thin sheet(s) and the composite material layer(s) may be simultaneously provided. The number of the composite material layer(s) may be equal to or smaller than the number of the aluminum-based thin sheet(s). In the multilayer plate, when the number of the aluminum-based thin sheets is multiple, one or two of two opposite outer layers of the multilayer plate is one or are two of the aluminum-based thin sheets correspondingly. That is, at least one outer layer of the multilayer plate is the aluminum-based thin sheet to provide the multilayer plate having the surface(s) with metallic texture. The composition and the variety of the composite material layers are as the description in the above embodiments, and are not repeated herein.

Then, a step 220 may be proceeded to perform a hot pressing operation by using, for example, a hot press, so as to hot press and bond the interlaced multiple layers into a plate to substantially complete the manufacturing of a multilayer plate with composite material, such as the aforementioned multilayer plates 100a-100d with composite material. In the hot pressing operation, after the thermoplastic polymer of the composite material layer is heated and pressed by the hot press, a portion of the thermoplastic polymer flows into the micro holes in the surface of the aluminum-based thin sheet, such that the portion of the thermoplastic polymer is embedded in the micro holes of the adjacent aluminum-based thin sheet. The micro holes with acute-angle appearance are formed in the surfaces of the aluminum-based thin sheet after the chemical treatment, such that an anchorage effect is created between the aluminum-based thin sheet and the thermoplastic polymer during the hot pressing operation, and the aluminum-based thin sheet and the thermoplastic polymer are directly jointed and locked to form the multilayer plate with composite material having excellent bonding force and air tightness, thereby greatly enhancing mechanical properties and reliability of the multilayer plate with composite material. Accordingly, the present embodiment can bond the dissimilar materials of a large-area aluminum-based thin sheet and a large-area composite material layer without using glue.

In some examples, by adjusting the stacked structures of the aluminum-based thin sheets and the composite material layers in the multilayer plates with composite material, the multilayer plates with composite material may have a bending strength ranging from about 230 MPa to about 550 MPa and a density ranging from about 1.95 g/cm³ to about 2.35 g/cm³, such that the multilayer plates with composite material have great industrial value. The multilayer plate with composite material in each of the embodiments may be used as a shell of a lightweight 3C product, and a weight of the multilayer plate with composite material may be more than 15% lighter than that of an aluminum alloy.

Then, a step 230 may be performed, taking the structure shown in FIG. 2 as an example, a passivation process of an anodizing treatment may be performed on the aluminum-based thin sheet 110 that has been laminated with the composite material layer 120 to form the first passivation layer 112. Due to the good bonding and air tightness between the aluminum-based thin sheet and the composite material layer, and the surface of the aluminum-based thin sheet being covered with the passivation layer, the multilayer plate with composite material can sustain an acid solution and an alkaline solution in the anodizing process without delamination. With this, the multilayer plate with composition material can be further decorated by a subsequent coloring process of the anodizing treatment, so that the appearance and the color of the multilayer plate with composition material can be more diverse. Through the metallic texture coloring method in the anodizing treatment, it has an advantage in texture and no volatile organic compound (VOC) pollution problem compared with the conventional appearance painting method of a carbon fiber composite material and a magnesium alloy.

The following uses the experimental results of various embodiments and comparative examples to more specifically illustrate the technical content and the effects of the embodiments of the present invention, but they are not intended to limit the present invention.

The material compositions and the characteristics of the multilayer plate with composite material of the embodiments and the comparative examples are listed in Table 1 below.

TABLE 1

| Illustration | | Embodiment | | | | | | Comparative example |
|---|---|---|---|---|---|---|---|---|
| | | 1 | 2 | 3 | 4 | 5 | 6 | 1 |
| Material composition | Structure | A | B | C | D | E | F | — |
| | Aluminum type | M1/M3 | M2/M3 | M4/M5 | M1 | M2 | M6 | 5052 |
| | Fiber type | G | G | G | G | G | G | — |
| | Aluminum sheet thickness | 0.3/0.15 | 0.3/0.15 | 0.15/0.1 | 0.3 | 0.3 | 0.2 | 0.8 |
| | Fiber thickness | 0.2 | 0.2 | 0.2 | 0.4 | 0.4 | 0.4 | — |
| | Structure thickness | 1.1 | 1.1 | 0.8 | 1.0 | 1.0 | 0.8 | 0.8 |
| Characteristic | Density | 2.331 | 2.287 | 2.090 | 2.253 | 2.309 | 2.130 | 2.75 |
| | Flexural strength | 336 | 251 | 270 | 544 | 262 | 230 | 275 |
| | Flexural modulus | 42 | 41 | 38 | 79 | 63 | 38 | 40 |

In above Table 1, the units of the aluminum sheet thickness, the fiber thickness, and the structure thickness are all mm, the unit of the density is g/cm³, the unit of the flexural strength is MPa, and the unit of the flexural modulus is GPa. Secondly, the aluminum type M1 is an aluminum alloy sheet of the model CA01 with a thickness of 0.3 mm, the aluminum type M2 is an aluminum alloy sheet of the model 1050 and a thickness of 0.3 mm, the aluminum type M3 is an aluminum alloy sheet of the model 1100 with a thickness of 0.15 mm, the aluminum type M4 is an aluminum alloy sheet of the model 1050 with a thickness of 0.15 mm, the aluminum type M5 is an aluminum alloy sheet of the model 5052 with a thickness of 0.1 mm, and the aluminum type M6 is an aluminum alloy sheet of the model 1050 with a thickness of 0.2 mm. The fiber type G is a glass fiber reinforced thermoplastic (GFRTP) with a thickness of 0.2 mm, in which the thermoplastic polymer is polycarbonate.

In addition, the structure A is a M1/G/M3/G/M1 laminated structure, the structure B is a M2/G/M3/G/M2 laminated structure, the structure C is a M4/G/M5/G/M4 laminated structure, the structure D is a M1/2G/M1 laminated structure, the structure E is a M2/2G/M2 laminated structure, and the structure F is a M6/2G/M6 laminated structure.

From Table 1 above, it is known that the multilayer plates with composite material of the embodiments of the present invention can effectively reduce the material density while maintaining the structural strength equivalent to that of the aluminum alloy of the comparative example, and achieve a lightweight effect.

The reliability of the multilayer plate with composite material of Embodiment 3 is verified, and a salt spray test conditions of Embodiment 3 are listed in Table 2 below.

TABLE 2

| Laboratory temperature (° C.) | Saturated cylinder temperature (° C.) | Relative humidity in laboratory (%) | Falling fog (mL/h) | Compressed air pressure (kg/cm$^2$) | Salt water proportion (g/cm$^3$) | PH value (PH) |
|---|---|---|---|---|---|---|
| 35 ± 2 | 47 ± 2 | 96~98 | 1.1~1.9 | 0.9~1.1 | 1.029~1.037 | 6.5~7.2 |

After the multilayer plate with composite material of Embodiment 3 is subjected to the salt spray test under the salt spray test conditions in Table 2 above, no corrosion and anodic treatment peeling are found. In addition, after the salt spray test, the surface layer of the multilayer plate with composite material of Embodiment 3 is rated as 5B by a cross-cut adhesion test, and the anode treatment is peeling off, thus the reliability is good.

According to the aforementioned embodiments, one advantage of the present invention is that the embodiments of the present invention stack and hot press at least one aluminum-based thin sheet and at least one composite material layer to form a multilayer plate with composite material, such that various multilayer plates with composite material of light weight and metallic texture can be successfully obtained by adjusting a ratio of the aluminum-based thin sheets to the composite material layers in each multilayer plate.

According to the aforementioned embodiments, another advantage of the present invention is that the embodiments of the present invention may form micro structure holes with obvious acute-angle appearance in surfaces of the aluminum-based thin sheet by using a chemical etching method firstly. Thus, by hot pressing the stacked structure of the aluminum-based thin sheet and the composite material layer directly, the hot pressed aluminum-based thin sheet and the composite material layer may be bonded firmly without using glue to bond the dissimilar materials of the aluminum-based thin sheet and the composite material layer.

According to the aforementioned embodiments, still another advantage of the present invention is that there is no glue between the aluminum-based thin sheet and the composite material layer of the multilayer plate with composite material of the present invention, such that the multilayer plate can sustain an acid solution and an alkaline solution in an anodizing process without laminating, and various multilayer plates with metallic texture and light weight can be effectively formed.

Although the present invention has been disclosed in considerable details with reference to certain embodiments, the foregoing embodiments of the present invention are illustrative of the present invention rather than limiting of the present invention. It will be apparent to those having ordinary skill in the art that various modifications and variations can be made to the present invention without departing from the scope or spirit of the present invention. Therefore, the spirit and scope of the appended claims should not be limited to the description of the embodiments contained herein.

What is claimed is:

1. A method for manufacturing a multilayer plate with composite material, the method comprising:

providing at least one aluminum-based sheet, wherein a third surface and a second surface, which are opposite to each other, of each of the at least one aluminum-based sheet both are formed with a plurality of micro holes, each of the at least one aluminum-based sheet comprises an aluminum-based metal layer, and two opposite surfaces of the aluminum-based metal layer are formed with a plurality of another micro holes;

stacking at least one composite material layer and the at least one aluminum-based sheet alternatively to form a multilayer plate, wherein a number of the at least one composite material layer is smaller than or equal to a number of the at least one aluminum-based sheet;

performing a hot pressing operation on the multilayer plate to fill a portion of each of the at least one composite material layer into the micro holes of the adjacent aluminum-based sheet; and performing a passivation process of an anodizing treatment on the multilayer plate to form a first passivation layer on the third surface and a first surface of the multilayer plate, wherein the first surface is opposite to the third surface.

2. The method of claim 1, wherein providing the at least one aluminum-based sheet comprises performing a chemical etching operation on the aluminum-based metal layer of the at least one aluminum-based sheet to form the third surface and the second surface of the at least one aluminum-based sheet having the micro holes with acute-angle appearance.

3. The method of claim 2, wherein the second surface of each of the at least one aluminum-based sheet is formed with a second passivation layer, and the second passivation layer is formed on the second surface after performing the chemical etching operation.

4. The method of claim 1, wherein providing the at least one aluminum-based sheet comprises performing a hot rolling thinning treatment on an aluminum-based metal sheet to form the aluminum-based metal layer of the at least one aluminum-based sheet.

5. The method of claim 4, wherein performing the hot rolling thinning treatment comprises forming surfaces of the aluminum-based metal layer of the at least one aluminum-based sheet having crystal grain preferred orientation of (110) plane.

6. The method of claim 1, wherein the second surface of each of the at least one aluminum-based sheet is formed with a second passivation layer, and a thickness of the first passivation layer is greater than a thickness of the second passivation layer.

7. The method of claim 6, wherein the first passivation layer is formed after forming the second passivation layer.

* * * * *